(No Model.) 2 Sheets—Sheet 2.
J. F. DE NAVARRO.
APPARATUS FOR TREATING HYDRAULIC CEMENT STONE.
No. 560,742. Patented May 26, 1896.
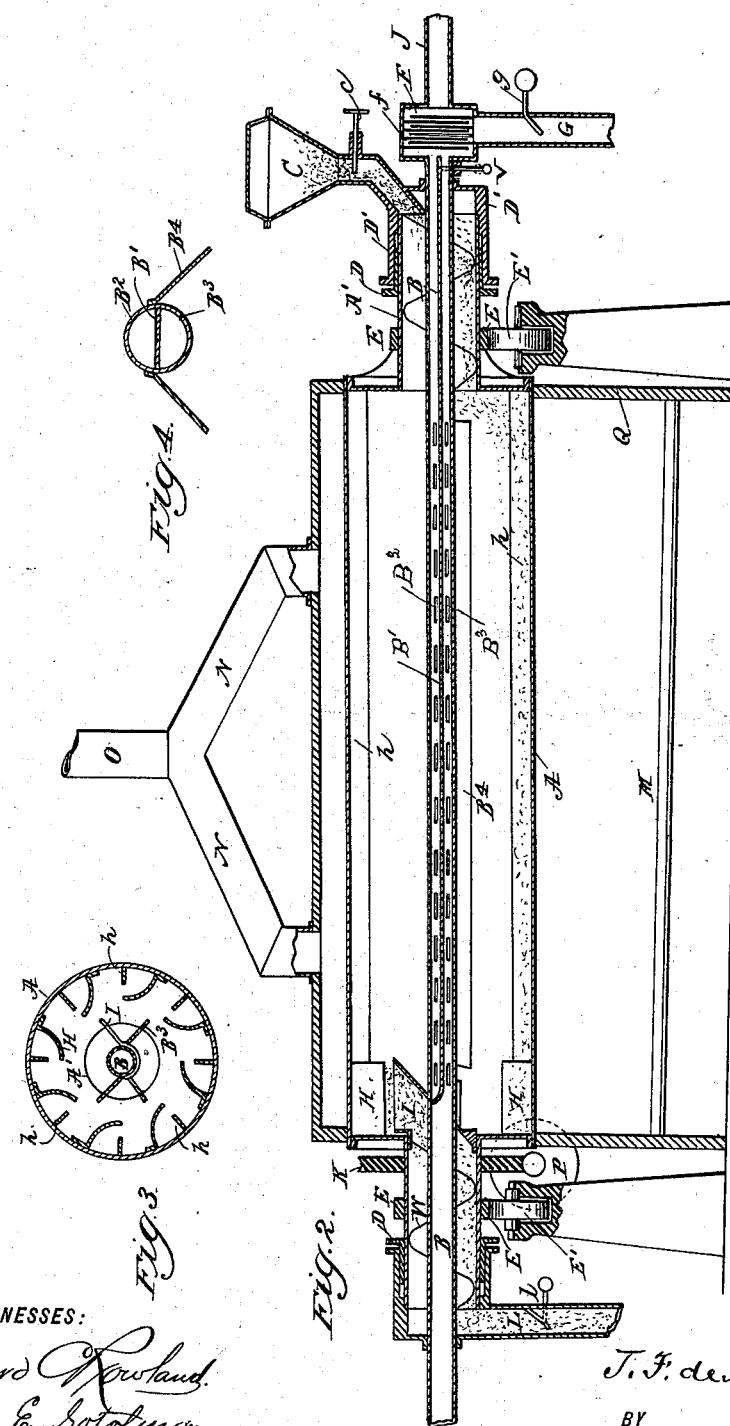
WITNESSES:
Edward Rowland.
Thomas E. Sotolongo
INVENTOR
J. F. de Navarro
BY
J. H. MacDonald
ATTORNEY

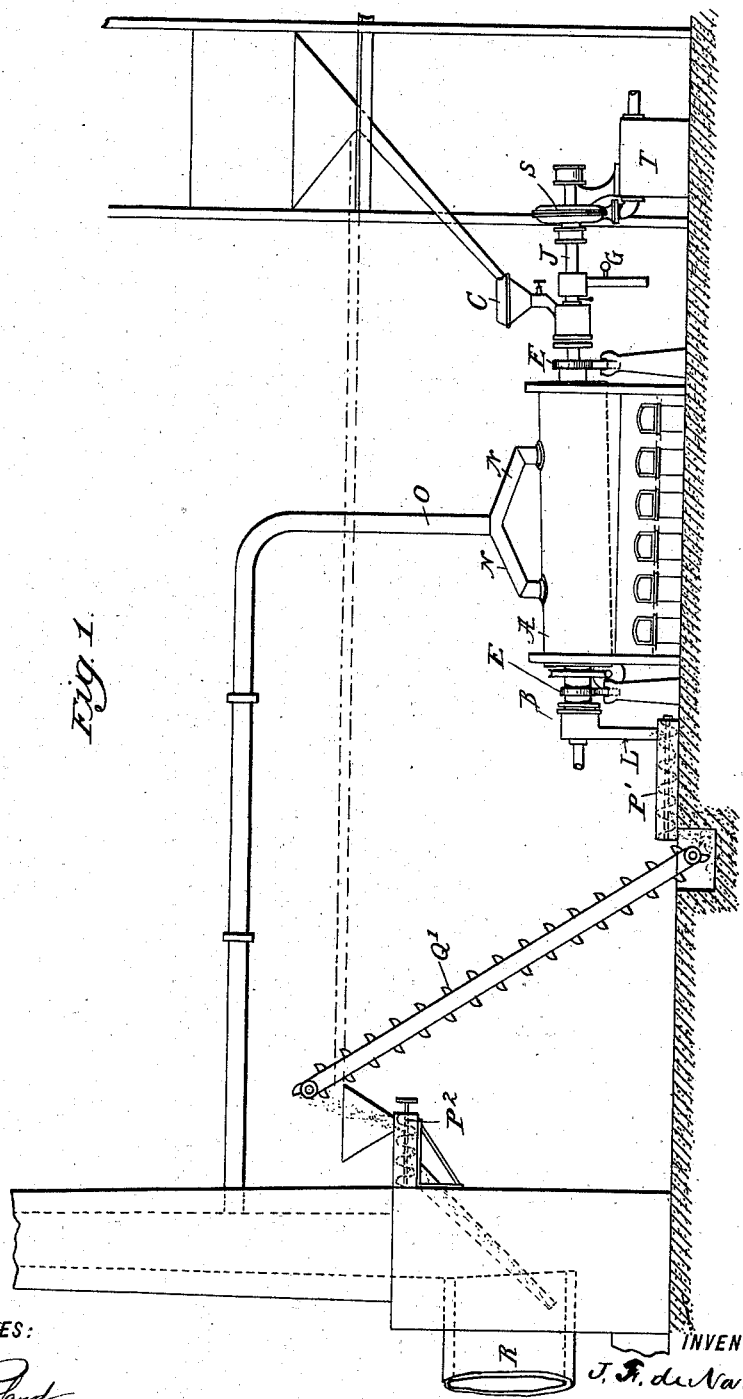

UNITED STATES PATENT OFFICE.

JOSÉ F. DE NAVARRO, OF NEW YORK, N. Y.

APPARATUS FOR TREATING HYDRAULIC-CEMENT STONE.

SPECIFICATION forming part of Letters Patent No. 560,742, dated May 26, 1896.

Application filed August 17, 1895. Serial No. 559,604. (No model.)

*To all whom it may concern:*

Be it known that I, JOSÉ F. DE NAVARRO, a citizen of Spain, residing at New York, county and State of New York, have invented certain new and useful Improvements in Apparatus for Treating Hydraulic-Cement Stone, of which the following is a specification.

My invention relates to a mechanical device for treating hydraulic-cement stone, as will be hereinafter more fully described in the specification, pointed out in the claims, and illustrated in the accompanying drawings, in which—

Figure 1 is a side elevation of a retort for expelling carbonic acid from the cement stone, a clinkering-kiln, and means for feeding and discharging the material to and from the retort and clinkering-kiln. Fig. 2 is a longitudinal section of the retort; Fig. 3, a section on line $x\,x$, Fig. 2; and Fig. 4, a section of the steam and gas inlet pipe.

It is well known that all hydraulic-cement stone contains a greater or less amount of carbonic acid, and this acid must be eliminated before the chemical reaction necessary to convert the stone into cement can take place. The raw material from which "Portland" hydraulic cement is made consists, essentially, of carbonate of lime, silica, and alumina. In some formations of silicious limestones these elements are found naturally combined in about their proper proportions; but as such stone is not general the proper proportions of the separate raw materials are mixed together in the form of bricks preparatory to burning. In either case before the reaction required between the silica or silicic acid and the lime can take place the carbonic acid must be expelled.

In the methods now generally employed the raw material is fed into the kilns with the carbonic acid retained therein, and as it is heavy and repellent great heat and considerable time are required to drive off the acid and bring the stone to the clinkering or sintering point.

By the apparatus here presented I propose to first eliminate all or a great proportion of the acid before the material is introduced to the clinkering-kilns, and thus avoid the objections noted. To produce a barrel of Portland cement, six hundred pounds of raw material are required. Of this about four hundred pounds are lime, silica, alumina, iron, and magnesia, the remainder being carbonic acid. As the raw material goes into the kiln it must be met by a high heat and maintained at such heat for a considerable time in order that the carbonic acid be set free and the silica attack the lime and alumina and bring about a complete decomposition of them. If, then, this latter decomposition and the consequent formation of basic silicate can be attained without the retardation referred to, the output of a kiln can be greatly increased and the cost of production correspondingly decreased. To attain the ends desired, I first pass the raw material (properly combined) through the retort hereinafter described, and after extracting all or a large portion of the carbonic acid convey the material to the clinkering-kiln.

Referring more particularly to the drawings, the retort consists of a rotating cylinder A, having at each end and integral therewith a cylindrical extension A'. At the rear end a cap D', passing over a stuffing-box D, closes the extension, the hopper C forming a portion of the cap and leading directly into the cylinder. At the front end the cylinder is closed by a corresponding cap and stuffing-box, this cap extending downward, as shown in Fig. 2, to form an outlet-discharge pipe L. The cylinders rest upon friction-rollers E' E, and the weight is therefore taken off the stuffing-boxes. At the front end of the cylinder a worm-gear K, actuated by pulley P, is secured to and gives rotary motion to the cylinders and retort; but any other suitable actuating mechanism may be used. Secured to the inside of the cylinders and rotating with them are worm-conveyers W, which feed the material in and out of the cylinders. Passing through the cylinders and retort longitudinally is a conduit B, having a diaphragm B', which divides the conduit into two divisions or compartments. The lower compartment, provided with openings B³, are for the passage of steam to the retort. The upper compartment, provided with openings B², is for the reception and exhaustion of the expelled gases and steam. The conduit has on each side a flange B⁴ extending downward to deflect the steam to the cement material. The rear end of the conduit terminates in a dust and gas chamber F, provided with deflecting-plates $f$. The retort is inclosed within walls Q and heated by a suitable furnace, the grate bars of which are shown at M, Fig. 2, the products of combustion passing off through the flues N O to the main stack.

The further construction and general operation of the device are as follows: The material in the retort fed thereto as described first becomes heated to a low red heat and parts with a portion of its carbonic acid. Steam is now introduced through conduit B into the retort and is deflected downward toward the material by the deflecting-flanges B⁴. The exhaust-fan S draws the gases and waste steam backward, and as the steam compartment is closed at its rear end by a valve V the gases are drawn into the upper compartment of the conduit, and thence outwardly through the dust and gas chamber F and pipe J to the condensing-chamber T. As the material is fed forward the blades $h$ turn it, and thus keep a constantly-changing surface for the action of the steam and heat. The steam coming in through the lower compartment and the gases and waste steam being drawn rearward by the exhaust fan, there is caused a constant circulation of steam through the material, so that all the material may at some time be subjected to the action of the steam. As it advances to the front of the retort the material becomes heated and expanded to its maximum, and when it finally reaches the forward end of the retort the whole or a greater portion of the carbonic acid has been eliminated and the stone is in proper condition for the final clinkering. Some material, such as that low in lime, (for a quick-setting cement,) may not require furnace heat, but may be treated by steam alone, and others (high in lime) may not require steam. In the latter case the valve V will be opened so that the gases can pass through both compartments of the conduit. The device will, however, generally be constructed as shown, so that the required conditions may always be quickly met. The expelled gases and dust which are drawn rearward pass into the chamber F, and are caused to pass up and down over the interposed plates $f$, which cause the dust to be intercepted and fall into the chute G and automatically discharged therefrom through the intervention of the weighted valve $g$, the gases passing out from the chamber through pipe J to the condenser T. The front end of the retort is provided with a series of buckets H, which, turning with the retort, catch the material and, lifting it, finally drop it into the hopper I, placed within the retort and opening into the forward cylinder. There it is conveyed forward through the cylinder by the worm-conveyer W and discharged into chute L, whence it is carried by the conveyers P' Q' P² to the kiln R, where it is converted into clinkers which are the basic silicates and aluminates of lime and a certain proportion of double silicates of lime and alumina and iron and lime. The kiln shown is a rotating one; but a vertical kiln suitably constructed may be used. In this kiln the treated material can be passed through more rapidly with less consumption of fuel and with quicker chemical reaction than if the carbonic acid had not been previously removed. Rosendale-cement stone (a natural cement stone which contains too large a percentage of magnesia to be converted into Portland cement) can be treated with equal advantage in the extraction of carbonic acid before calcination. It will be noted that there are but two stuffing-boxes used, and as they are exterior to the cylinders and under constant observation insulation against nitrogen and cold air is assured. The head of material in the inlet and outlet chutes prevents the introduction of air at those points, and from their location, as shown and described, the material is fed and discharged exterior to the retort.

Having thus described my invention, what I claim as new, and desire to secure by Letters Patent, is—

1. In a device of the nature described the combination with a rotary retort having integral cylindrical extensions at each end, of closing-caps having integral ingress and egress chutes and conveyers attached to and actuated by said cylinders to carry the material to and from the retort, as and for the purpose set forth.

2. In a device of the nature described the combination with the rotary retort having integral end cylinders and conveyers actuated by said cylinders, of buckets H, secured to the retort and carried thereby and a chute I within the retort and leading into the discharge-cylinder, as and for the purpose set forth.

3. In a device of the nature described, the combination with the rotary retort of a conduit passing longitudinally through the retort, said conduit having a diaphragm dividing it into separate compartments, said compartments being perforated at the bottom and top, respectively, for the egress of steam and exhaustion of expelled gases, as and for the purpose set forth.

4. In a device of the nature described, the combination with the retort and longitudinally-divided conduit having perforations in its upper and lower planes, of a chamber at one end of said conduit and means within said chamber for collecting dust and vapor expelled through the conduit, substantially as set forth.

5. In a device of the nature described the combination with the retort of a perforated conduit passing through the retort; said conduit having a longitudinal diaphragm and provided at one end with a chamber, F, having dust-retarding plates, an outlet for the dust and an outlet for the gases, as and for the purpose set forth.

JOSÉ F. DE NAVARRO.

Witnesses:
THOMAS E. SOTOLONGO,
I. H. MACDONALD.